(12) United States Patent
Dehan

(10) Patent No.: US 6,623,311 B1
(45) Date of Patent: Sep. 23, 2003

(54) ELECTRICAL WIRING ORGANIZER FOR USE IN AN ELECTRICAL JUNCTION BOX

(75) Inventor: Yoram Dehan, Migdal HaEmek (IL)

(73) Assignee: Patentoo R&D Ltd., Migdal Hemek (IL)

(*) Notice: Subject to any disclaimer, the term of this patent is extended or adjusted under 35 U.S.C. 154(b) by 0 days.

(21) Appl. No.: 09/890,128
(22) PCT Filed: Jan. 27, 2000
(86) PCT No.: PCT/IL00/00052
§ 371 (c)(1),
(2), (4) Date: Oct. 29, 2001
(87) PCT Pub. No.: WO00/45488
PCT Pub. Date: Aug. 3, 2000

(30) Foreign Application Priority Data

Jan. 27, 1999 (IL) ................................................ 128249

(51) Int. Cl.⁷ ................................................ H01R 9/22
(52) U.S. Cl. ...................................... 439/721; 439/724
(58) Field of Search ................................ 439/721, 723, 439/724, 796, 797, 798, 712–718, 535, 949; 174/59, 60

(56) References Cited

U.S. PATENT DOCUMENTS

| | | | |
|---|---|---|---|
| 1,426,210 A | * 8/1922 | O'Neil | 174/59 |
| 2,427,965 A | 9/1947 | Henderson | 439/721 |
| 2,528,989 A | 11/1950 | Ammells | 439/721 |
| 2,892,176 A | * 6/1959 | Gordon | 439/421 |
| 3,774,145 A | * 11/1973 | Vlahos | 439/421 |
| 5,403,678 A | * 4/1995 | Fields | 439/65 |

FOREIGN PATENT DOCUMENTS

DE 7311225 8/1973

* cited by examiner

Primary Examiner—Ross Gushi
(74) Attorney, Agent, or Firm—Browdy and Neimark, P.L.L.C.

(57) ABSTRACT

An electrical wiring organizer for use in an electrical junction box for feeding electrical power from a main power line to one or more wall sockets and/or light fitments and their associated light switches, and which includes an annular arrangement of three electrically insulated, elongated "polarity type" connection units each associated with a single polarity of the polarities live, neutral and earth, each "polarity type" connection unit being capable of having a plurality of conductors electrically connected thereto along its length whereby all of its associated conductors of the one or more wall sockets and/or light fitments are connected to its associated conductor of the main power line. In addition, the electrical wiring organizer preferably includes one or more "switch live type" connection units each being electrically insulated from another connection unit and capable of electrically interconnecting a pair of switch live connectors.

13 Claims, 3 Drawing Sheets

US 6,623,311 B1

ELECTRICAL WIRING ORGANIZER FOR USE IN AN ELECTRICAL JUNCTION BOX

REFERENCE TO RELATED APPLICATIONS

The present application is the national stage under 35 U.S.C. 371 of international application PCT/IL00/00052, filed Jan. 27, 2000 which designated the United States, and which international application was published under PCT Article 21(2) in the English language.

FIELD OF THE INVENTION

This invention relates to electrical wiring organizers in general and in particular for use in electrical junction boxes of the type sunken in a wall, a wall partition, a ceiling, and the like, and employed for feeding electrical power from a main power line to one or more wall sockets and/or light fitments.

BACKGROUND OF THE INVENTION

An electrical circuit feeds electrical power from a main power line to every electrical outlet associated therewith. Electrical outlets basically fall into one of three types each requiring a different number of conductors for connection to the main power line as follows: First, a simple wall socket which requires three conductors (Give, neutral, and earth). Second, a light fitting operable from a single light switch, the light fitting requiring three conductors (neutral, earth, and switch live), and the light switch requiring two conductors (live, and switch live). And third, a light fitting independently operable from two light switches, the light fitting requiring three conductors (neutral, earth, and switch live), one light switch requiring three conductors (live, and two switch live), and the other light switch also requiring three conductors (all switch live).

Even a small room in a house such as a bedroom may have two wall sockets and one each of the two different types of light fitments resulting in a total of 20 conductors for connection to the main power line typically by way of one or more electrical junction boxes sunken into the walls and/or ceiling depending on the circuit layout. The actual electrical connections in a junction box are often by way of so called plastic flex connectors, plastic caps, and other types of connectors for interconnecting all the conductors of the same polarity of the different electrical outlets to their respective conductor of the main power line, and suitably interconnecting the switch live conductors. As every average householder who has ever needed to open up a junction box can testify, a junction box typically contains a large number of conductors connected up in a bewildering way.

SUMMARY OF THE INVENTION

In accordance with the present invention, there is provided an electrical wiring organizer for use in an electrical junction box for feeding electrical power from a main power line to one or more wall sockets and/or light fitments and their associated light switches, the electrical wiring organizer comprising an annular arrangement of three electrically insulated, elongated "polarity type" connection units each associated with a single polarity of the polarities live, neutral and earth, each "polarity type" connection unit being capable of having a plurality of conductors electrically connected thereto along its length whereby all of its associated conductors of the one or more wall sockets and/or light fitments are interconnected to its associated conductor of the main power line.

The electrical wiring organizer of the present invention provides for a simple and convenient means for organizing the often many conductors entering into a junction box by simply interconnecting all the conductors of a single polarity with their corresponding conductor of the main power line by way of a single elongated "polarity type" connection unit along whose length conductors can be electrically connected thereto. In addition, the electrical wiring organizer preferably includes one or more "switch live type" connection units each being electrically insulated from another connection unit and capable of electrically interconnecting a pair of switch live conductors. The connections units are preferably packaged in electrically insulated casings which are color coded in accordance with the standard color scheme of brown designing live (L), blue designating neutral (N), green/yellow designating earth (E), and purple designating switch live (SL). The electrical wiring organizer of the present invention is packaged so as to be conveniently insertable within existing electrical junction boxes and facilitates wiring up new electrical circuits and rewiring existing electrical circuits, and their subsequent maintenance or alteration.

DETAILED DESCRIPTION OF THE DRAWINGS

In order to understand the invention and to see how it may be carried out in practice, preferred embodiments will now be described, by way of a non-limiting examples only, with reference to the accompanying drawings, in which.

DETAILED DESCRIPTION OF THE DRAWINGS

Figure 1:
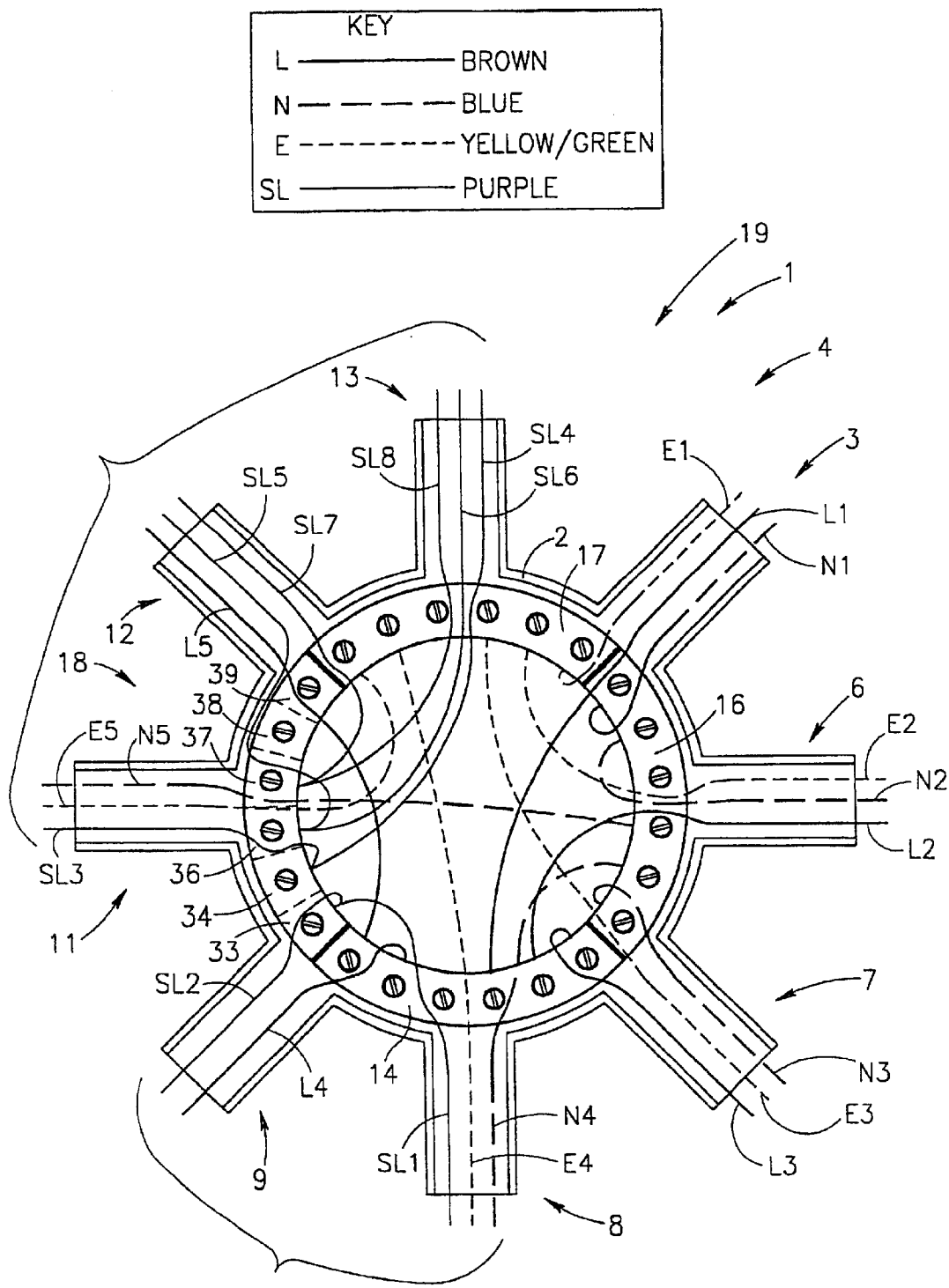
FIG. 1 is a schematic representation showing the use of an electrical wiring organizer of the present invention for connecting a main power line to an electrical circuit including two wall sockets, a light fitting operable from a single light switch, and a light fitting independently operable from two light switches.
Figure 2:
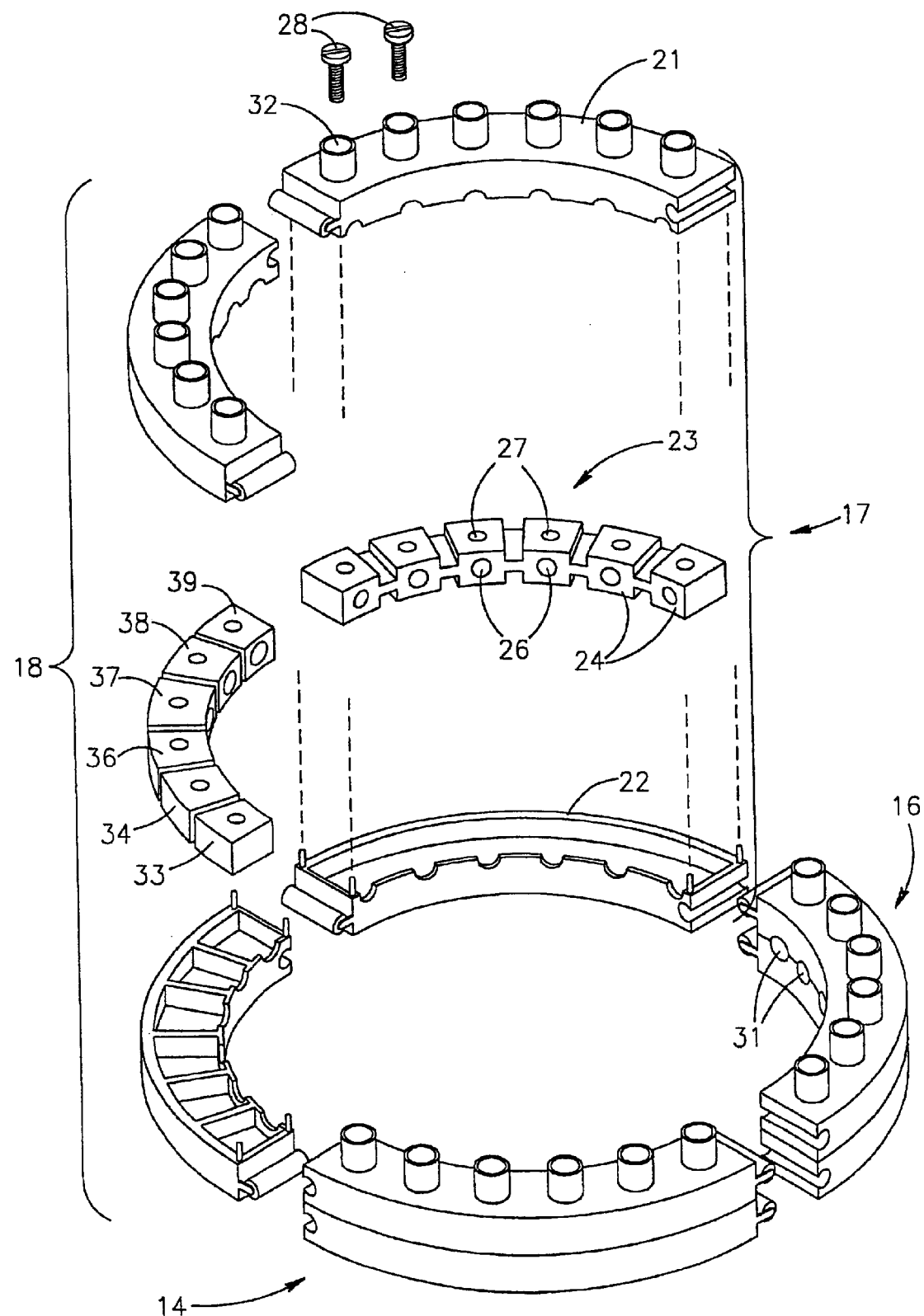
FIG. 2 is a pictorial representation showing a preferred embodiment of the electrical wiring organizer of FIG. 1 in a partly dissembled state.

With reference now to FIGS. 1 and 2, an electrical wiring organizer 1 is disposed in an electric junction box 2 for connecting a main power line 3 to an examplary electrical circuit 4 including two wall sockets 6 and 7, a light fitting 8 operable from a single light switch 9, and a light fitting 11 independently operable from two light switches 12 and 13 as may be installed in a bedroom. The electrical wiring organizer 1 includes four insulated casings 14, 16, 17 and 18 gangable together to form a generally circular housing 19 whereby conductors of the main power line 3 and the electrical circuit 4 are connected to the electrical wiring organizer 1 in a generally radially outward direction relative to the center of the electrical junction box 2.

The three casings 14, 16 and 17 are identical and each include a top cover 21, a lower base 22, and a unitary typically brass connector fitting 23 interdisposable between a top cover 21 and the lower base 22. Each connector fitting 23 constitutes a so-called "polarity type" connection unit provided with six electrically interconnected terminals 24. Each terminal 24 has a radially directed throughbore 26 into which one or more conductors can be inserted, and a vertically directed threaded throughbore 27 for receiving a holding screw 28 for securing the one or more conductors. Each casing 14, 16 and 17 has six radially directed throughbores 31 and six vertically directed throughbores 32 in registration with the throughbores 26 and 27, respectively, on assembly. The casing 18 is outwardly similar to the casings 14, 16 and 17 but it accommodates six electrically insulated terminals 33, 34, 36, 37, 38 and 39 (shown by dashed lines) each similar to a terminal 24 and constituting a so-called "switch live type" connection unit.

The casing 14 is employed for electrically interconnecting the four live conductors of the electrical circuit 4 to the live conductor L1 of the main power line 3 as follows: the live conductor L2 from the wall socket 6, the live conductor L3 from the wall socket 7, the live conductor L4 from the light switch 9, and the live conductor L5 from the light switch 12. The casing 16 is employed for electrically interconnecting the four neutral conductors of the electrical circuit 4 to the neutral conductor N1 of the main power line 3 as follows: the neutral conductor N2 from the wall socket 6, the neutral conductor N3 from the wall socket 7, the neutral conductor N4 from the light fitting 8, and the neutral conductor N5 from the light fitting 11. The casing 17 is employed for electrically interconnecting the four earth conductors of the electrical circuit 4 to the earth conductor E1 of the main power line 3 as follows: the earth conductor E2 from the wall socket 6, the earth conductor E3 from the wall socket 7, the earth conductor E4 from the light fitting 8, and the earth conductor E5 from the light switch 12.

The terminal 33 is employed for electrically interconnecting the two switch live conductors SL1 and SL2 of the light fitting 8 and the light switch 9, respectively. The terminal 34 is employed for electrically interconnecting the two switch live conductors SL3 and SL4 of the light fitting 11 and the light switch 13, respectively. The terminal 36 is employed for electrically interconnecting the two switch live conductors SL5 and SL6 of the light switch 12 and the light switch 13, respectively. The terminal 37 is employed for electrically interconnecting the two switch live conductors SL7 and SL8 of the light switch 12 and the light switch 13, respectively. The terminals 38 and 39 are not required for the electrical circuit 4.

Figure 3:
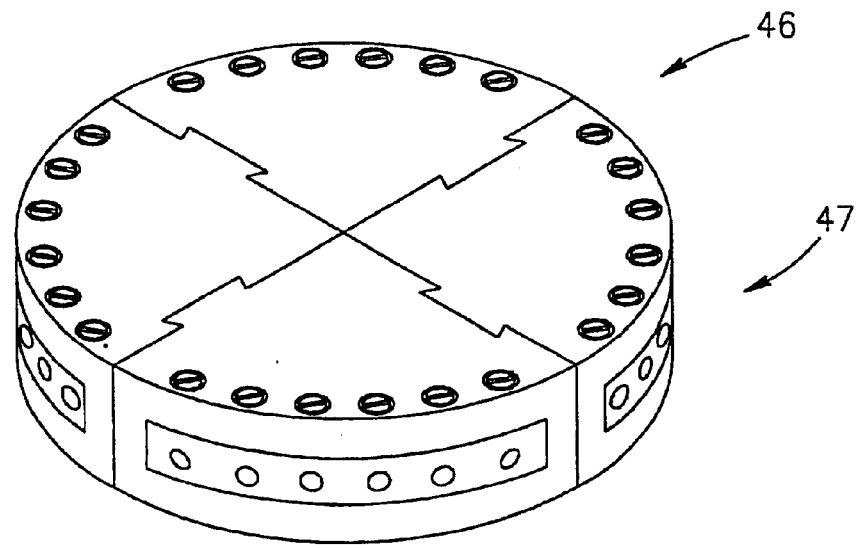
FIG. 3 is a pictorial representation showing an alternative embodiment of an electrical wiring organizer of the present invention.
Figure 4:
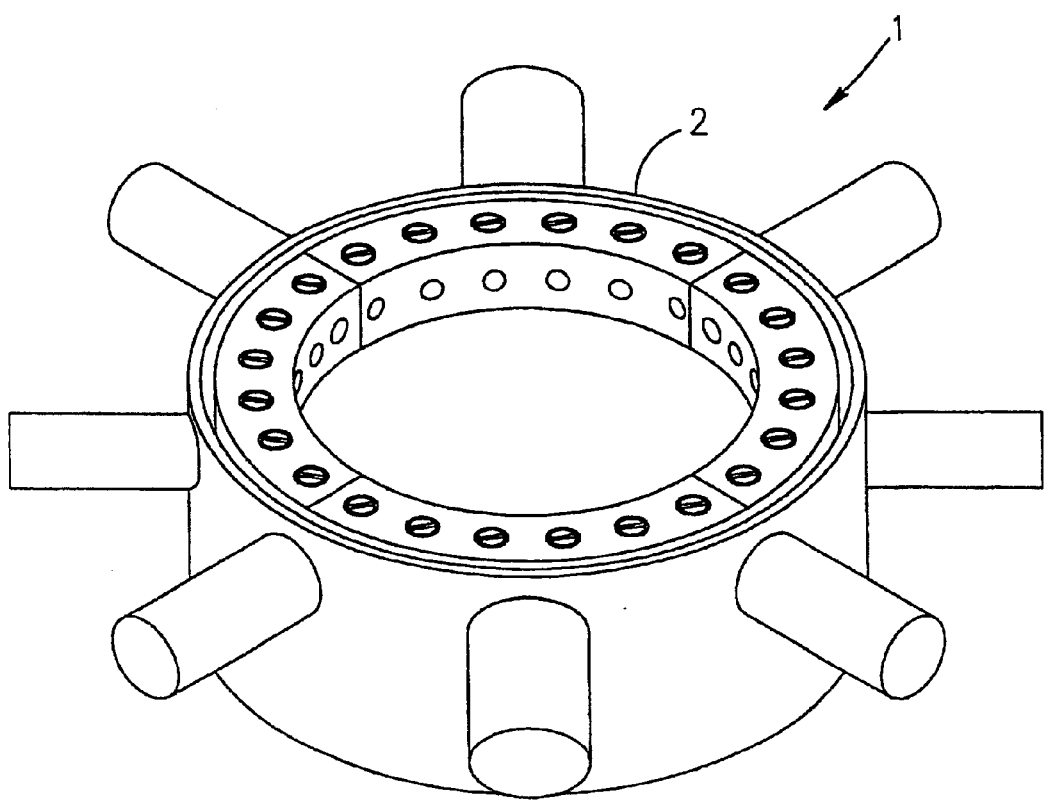
FIG. 4 is a pictorial representation showing the electrical wiring organizer of FIG. 2 integrally formed with an electrical junction box.

While the invention has been described with respect to a limited number of embodiments, it will be appreciated that many variations, modifications and other applications of the invention can be made which fall within the scope of the claims appended hereto. For example, an electrical wiring organizer 46 of the present invention can be configured in a generally circular housing 47 (see FIG. 3) whereby conductors are connected to their respective connection units in a generally radially inward direction relative to the center of an electrical junction box. Also, an electrical wiring organizer 1 of the present invention can be integrally formed with an electrical junction box 2 (see FIG. 4). And, a casing can include a "polarity type" connection unit and one or more "switch live type" connection units.

What is claimed is:

1. An electrical wiring organizer for use in an electrical junction box for feeding electrical power from a main power line having a plurality of conductors to at least one wall socket and/or a plurality of light fittings, each light fitting having at least one associated light switch and an associated switch live conductor, the electrical wiring organizer comprising an arrangement of modular connection units, said connection units comprising:

at least one "polarity type" connection unit constructed for connecting one conductor of the main power line to at least one of the wall sockets and/or light fittings; and at least one "switch live type" connection unit constructed for connecting together the switch live conductors of at least two of said light fittings, wherein said connection units are configured to be connected together to form an integral structure.

2. The electrical wiring organizer according to claim 1, wherein each of said connection units is configured as a segment and all of said connection units form an annular structure when connected together.

3. The electrical wiring organizer according to claim 1, wherein each of said connection units comprises a top cover, a lower base and a connector fitting interposed between said top cover and said lower base, and said connector fitting comprises a plurality of terminals for attachment to selected conductors of the main power line, the at least one socket and the plurality of fittings.

4. The electrical wiring organizer according to claim 1, wherein the plurality of terminals of said connector fitting of said "polarity type" connection unit are conductively connected together and the plurality of terminals of said connector fitting of said "switch live type" connection unit are electrically insulated from one another.

5. The electrical wiring organizer according to claim 1, wherein said modular connection units are formed integrally with the junction box.

6. The electrical wiring organizer according to claim 1, wherein at least one of said modular connection units is color-coded to designate its type.

7. The electrical wiring organizer according to claim 1, wherein there are a total of four of said connection units.

8. The electrical wiring organizer according to claim 1, wherein said connection units comprise securing means for connecting said connection units together.

9. The electrical wiring organizer according to claim 8, wherein each said connection unit has a first end and a second end and said securing means comprise a male connecting part at said first end and a female connecting part at said second end of each said connection unit.

10. The electrical wiring organizer according to claim 1, wherein each of said connection units is configured as a sector and all of said connection units form a disc structure when connected together.

11. The electrical wiring organizer according to claim 10, wherein said connection units comprise securing means in the form of dovetail elements for connecting said connection units together.

12. The electrical wiring organizer according to claim 1, wherein the junction box encloses a space having a defined form and said integral structure has a perimeter shaped to conform to the defined form.

13. The electrical wiring organizer according to claim 12, wherein said integral structure is deployable within the junction box.

\* \* \* \* \*